Nov. 28, 1961  S. A. YOUNG  3,010,120
BATH PLUG CONSTRUCTION
Filed Feb. 23, 1960

INVENTOR.
S. A. Young
BY
Robb & Robb
ATTORNEYS

United States Patent Office 3,010,120
Patented Nov. 28, 1961

3,010,120
BATH PLUG CONSTRUCTION
Stephen A. Young, R.R. 4, Monticello, Ind.
Filed Feb. 23, 1960, Ser. No. 10,290
1 Claim. (Cl. 4—295)

This invention relates to drain control means, primarily means particularly adapted for bathtubs or the like.

Bath drains, are usually of the type availing of a rubber stopper for closing the same or of so-called trip lever construction, which enables control by a lever mounted in the overflow opening and effecting operation of a plunger mounted within the drain structure itself for controlling outflow of water from the tub.

The instant invention incorporates many of the advantages of the trip lever type of drain, and the simplicity and low cost makes the same most suitable for use where competitive factors are substantial for even controlling as respects the installation of drain equipment, and yet the drain control is more effective than a rubber plug and has none of the disadvantages thereof.

The invention herein contemplates the provision of a simply constructed plug unit involving a valve member which is operable to be positioned in an open position, remain there, and yet without knowledge of the manner of removal of the plug, prevents such removal under ordinary circumstances.

The advantages of the invention hereof, reside in the fact that the construction of the device, make possible positioning of the valve member thereof in an open position, the valve member remaining there until manipulated to permit closure of the same, the valve member in addition being removable when the lock means are disengaged to permit such manipulation.

It is therefore a principal object of this invention to provide a bath plug construction, involving simple mechanical elements which facilitate the positioning of the plug in open position, manipulation to close the plug is simple, and yet at the same time prevents unauthorized removal of the valve member.

Another object of the invention is to provide bath plug construction, involving means which enable the valve member to be positioned in open position, and closed by slight rotation. In the alternative, the valve member can be maintained in open position and cannot be closed without more than the simple manipulation mentioned, by reason of the provision of threaded elements which must be disengaged to effect such closing.

Yet another object of the invention is to provide means whereby the valve member of the plug construction may be maintained in open condition by the means which provide for locking the same against unauthorized removal, such means further serving as a guide for closing the same during closing movement.

Other and further objects of the invention will be understood from a consideration of the specification appended hereto and shown in the drawing wherein:

FIGURE 1 is a somewhat fragmentary view, partly in elevation, and in section, illustrating a drain construction incorporating therein the bath plug hereof, the bath plug being shown in open condition to permit water to drain from a bathtub or the like.

Figure 1:
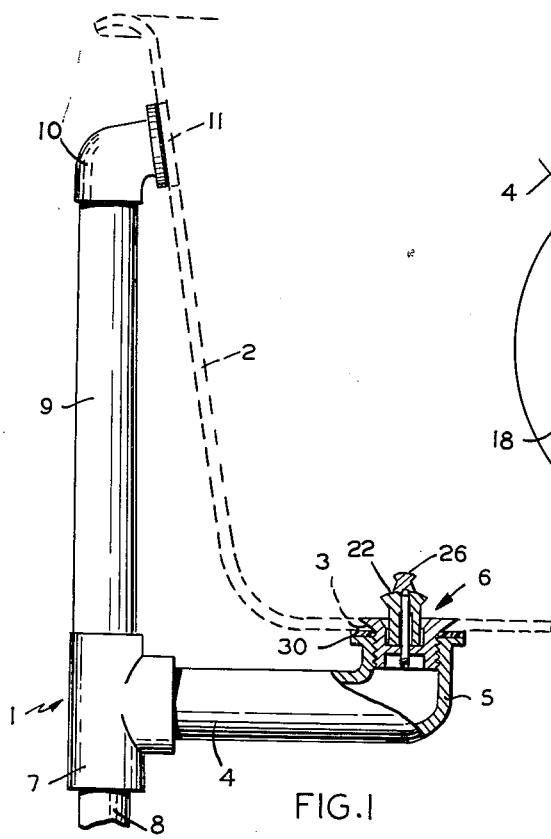

Referring now to FIGURE 1, a bath drain, generally designated 1 is shown as being mounted on a bathtub indicated in dotted lines at 2, the drain opening 3 of the bathtub having positioned therebeneath the drain arm 4 with the drain L 5 thereon, the drain L 5 having mounted therein the bath plug construction denoted at 6 generally.

The drain arm 4 extends to a drain T 7, the drain T in turn permitting water to drain through the waste tube 8 to a main drain, not shown but readily apparent to those skilled in the art.

Extending upwardly from the drain T 7 is an overflow arm 9 at the upper end of which is an overflow L 10, the L 10 leading to an overflow opening 11 formed in the tub 2.

Figure 2:
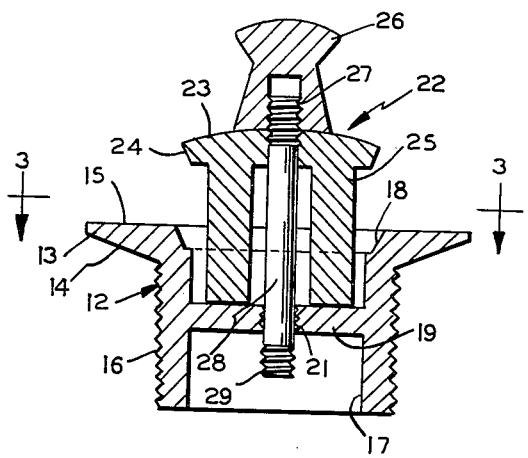
FIGURE 2 is an enlarged sectional view showing the various components of the plug construction hereof.

The bath plug construction which is denoted 6, is shown in enlarged details in the subsequent figures, and referring to FIGURE 2, the body of the plug is denoted 12, having a circular flange at its upper end denoted 13 with a bevelled lower surface 14 thereof and a generally flat upper surface 15, the bevelled surface extending inwardly and terminating adjacent the threads 16 formed on the outer surface of the plug body 12.

The plug body 12 is provided interiorly with a passage 17, at the upper end of which is a seat 18, bevelled and extending to the surface 15 previously referred to.

Figure 3:
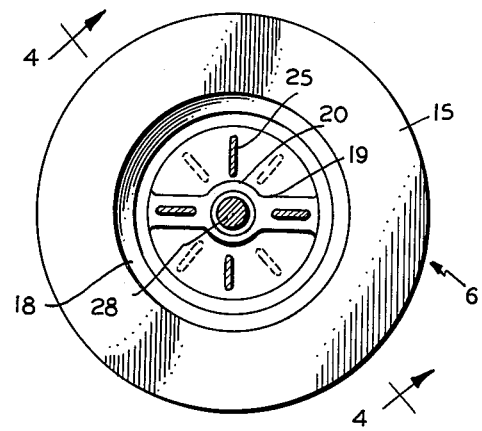
FIGURE 3 is a transverse sectional view taken about on the line 3—3 of FIGURE 2 looking in the direction of the arrows.

Within the passage 17 is a cross piece 19, which may preferably be integral with the plug body 12 and as shown in FIGURE 3 having an enlarged central portion 20 in which threads 21 are formed.

A valve member generally designated 22 is provided for manipulation with respect to the passage 17, and includes a head 23 at the upper portion of the member, said head having a bevelled seat section 24 formed thereon. The upper surface of the head 23 may be concave and extending downwardly therefrom and preferably integrally, are the positioning means 25, which as shown in FIGURE 3 are relatively thin elongated members extending a substantial distance downwardly from the head 23. The members 25, are intended to be positioned in engagement with the cross piece 19 when it is desired to maintain the valve member 22 in open condition, as shown in FIGURE 2. Obviously the head 23 will thereby be maintained in a spaced condition from the seat 18 and permit the water to flow out of the tub through the passage 17.

In order to provide for manipulation of the valve 22, a suitable handle or knob 26 is furnished, the knob 26 engaging with the upper surface of the head 23 if desired, and being provided interiorly with a threaded section 27 from which extends downwardly a rod like member 28, which is an instrumentality for preventing removal of the valve member 22 as will now be explained.

The rod like member 28, is provided at its lower extremity with suitable threads 29, which threads 29 are mating threads for the threads 21. The threads 29 act as a lock since unless the threads are engaged with the threads 21, removal of the valve member 22 will not be possible as will be readily understood.

The rod like member 28 operates as a guide by reason of the positioning of the member so as to move in the threaded section of the cross piece 19 up and down movement of the valve member 22 being facilitated. The positioning means 25 likewise provide for guiding of the member 22 within the passage 17 as will likewise be readily understood in view of the arrangement and location of the same, there being four of such means provided.

It should also be understood that under normal conditions when it is desired to open the valve and maintain the same in open condition, it may be lifted by the knob 26, and the positioning means 25 arranged so as to occupy the position shown in FIGURE 3, with the lower extremities of an opposite pair of the means 25 engaging the cross piece. By rotating the valve member 22 slightly to locate the means 25 as shown by the dotted line position of the same in FIGURE 3, the valve member may be permitted to drop downwardly by reason of the weight of the same so that the head 23 will be arranged with the seat portion 24 thereof in engagement with the seat 18 of the plug body 12.

Figure 4:
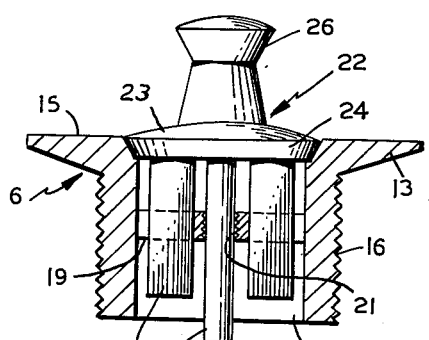
FIGURE 4 is a sectional view, showing further details of the construction with the valve in closed condition taken about on the line 4—4 of FIGURE 3 looking in the direction of the arrows.

If it is desired to prevent the valve member 22 from being accidentally displaced so that it will drop downwardly in the passage and shut the same off, it is only necessary that the threads 29 on the lower end of the rod like member 28 are caused to engage the threads 21 within the cross piece 19. The valve member may be rotated to disengage the threads either to remove the valve member 22 entirely, or in the alternative if it is desired to close the same whereby the parts are in condition shown in FIGURE 4 wherein the valve member is seated and flow of water through the plug construction is prevented.

It should be understood that the drain L 5 will have suitable threads therewithin to engage the corresponding threads 16 of the plug, a suitable gasket such as 30 being provided to effectively seal the plug in the outlet 3 and prevent undesired leakage from the tub.

In view of the foregoing, it will be clear that there has been provided hereby, a novel bath plug which involves a simple valve member adapted to be operated so as to be maintained in opened condition, locked in effect from unauthorized removal, availing of lock construction to maintain the valve member in open condition if desired, and facilitating ready manipulation to close the valve member and prevent outflow as required.

I claim:

In bath drain construction of the class described, in combination, a plug body for mounting in a drain opening, a passage therethrough, a cross-piece in said passage, a valve member to regulate water flow through the passage, said member including a shut-off head, positioning means comprising members extending beneath the head to engage the cross-piece to maintain the valve in open position and guide the valve member to closed position upon rotation of said member, an opening in the cross-piece, threads in said opening, and a rod-like part extending beneath the head and through said opening, said part having a threaded end portion to cooperate with said opening threads to maintain the valve in positive open position, and likewise prevent removal of said valve when the positioning means are in position to engage the cross-piece aforesaid.

References Cited in the file of this patent

UNITED STATES PATENTS

| | | |
|---|---|---|
| 1,071,627 | Reenstierna | Aug. 20, 1913 |
| 1,136,441 | Schmidt | Apr. 20, 1915 |
| 1,630,352 | Mortimer | May 31, 1927 |
| 2,896,223 | Treslo | July 28, 1959 |